United States Patent
Debrailly et al.

(10) Patent No.: US 7,114,853 B2
(45) Date of Patent: Oct. 3, 2006

(54) SUSPENSION THRUST BEARING DEVICE

(75) Inventors: Franck Debrailly, Monnaie (FR);
Thierry Poulle, Neuvy le Roi (FR)

(73) Assignee: Aktiebolaget SKF, Göteborg (SE)

( * ) Notice: Subject to any disclaimer, the term of this patent is extended or adjusted under 35 U.S.C. 154(b) by 114 days.

(21) Appl. No.: 10/934,083

(22) Filed: Sep. 3, 2004

(65) Prior Publication Data
US 2005/0089255 A1 Apr. 28, 2005

(30) Foreign Application Priority Data
Sep. 4, 2003 (FR) .................................. 03 10483

(51) Int. Cl.
*F16C 19/10* (2006.01)

(52) U.S. Cl. ...................... 384/612; 384/611

(58) Field of Classification Search ................ 384/612, 384/615, 617, 609, 611
See application file for complete search history.

(56) References Cited

U.S. PATENT DOCUMENTS

| | | | |
|---|---|---|---|
| 4,699,530 A | 10/1987 | Satoh et al. | |
| 4,872,768 A | 10/1989 | Brandenstein et al. | |
| 5,018,384 A | 5/1991 | Hayashi et al. | |
| 5,575,568 A | 11/1996 | Rigaux et al. | |
| 5,713,577 A | 2/1998 | Lannert et al. | |
| 6,011,491 A | 1/2000 | Goetzl | |
| 6,109,624 A | 8/2000 | Message et al. | |
| 6,267,512 B1 | 7/2001 | Beghini et al. | |
| 6,612,749 B1 | 9/2003 | Arnault et al. | |
| 2003/0002764 A1 | 1/2003 | Pflugner et al. | |
| 2004/0013334 A1 | 1/2004 | Landrieve et al. | |
| 2005/0008276 A1 | 1/2005 | Beghini et al. | |

FOREIGN PATENT DOCUMENTS

| | | |
|---|---|---|
| DE | 19809074 | 1/1999 |
| DE | 10042677 | 3/2002 |
| EP | 0511105 | 10/1992 |
| EP | 0930505 | 7/1999 |
| EP | 0992797 | 4/2000 |
| FR | 2375484 | 7/1978 |
| FR | 2744506 | 8/1997 |
| FR | 2779096 | 12/1999 |

(Continued)

OTHER PUBLICATIONS

Preliminary Search Report for FR 0310483 mailed on Apr. 1, 2004 (2 pages).

(Continued)

*Primary Examiner*—Lenard A. Footland
(74) *Attorney, Agent, or Firm*—Meyertons, Hood, Kivlin, Kowert & Goetzel, P.C.; Eric B. Meyertons

(57) ABSTRACT

A suspension thrust bearing device includes a rolling bearing provided with two races and with rolling elements arranged between the races, and two caps each in contact with one race, one of the caps including a circular flange and the other cap including an axial portion provided with hooks intended for latching onto the said flange, which hooks leave an axial space of height b remaining between the said hooks and the said flange, one of the caps including an operational part provided with a chamfer intended to facilitate latching with the other cap, with an axial surface of height a and of diameter D and with a radial retention surface, and the other cap including an operational part provided with a chamfer intended to facilitate latching, with an axial surface of height c and with a radial retention surface, the sum of the heights a+b+c being greater than 1.9% of the diameter D.

7 Claims, 6 Drawing Sheets

FOREIGN PATENT DOCUMENTS

| | | |
|---|---|---|
| FR | 2829429 | 3/2003 |
| JP | 6213251 | 8/1994 |
| WO | 02052280 | 7/2002 |
| WO | 03022606 | 3/2003 |

OTHER PUBLICATIONS

"Federbeinlagerung für Kraftfahrzeug", May 31, 1972, 6 pages (German) (DE7208788).

International Search Report for PCT/FR 02/03077 mailed Jan. 21, 2003 (2 pages).

SUSPENSION THRUST BEARING DEVICE

BACKGROUND OF THE INVENTION

1. Field of the Invention

The present invention relates to the field of suspension thrust bearings used in particular in motor vehicles for the telescopic suspension struts of the steered wheels.

2. Description of the Relevant Art

A suspension thrust bearing generally includes an upper race and a lower race between which are arranged rolling elements in the form of balls or rollers. A suspension thrust bearing is generally arranged in the top of the suspension strut, between a suspension spring and an upper element secured to the body of the vehicle. The spring of the suspension device is installed around the rod of the damper piston, the end of which is secured to an elastic support block. The suspension thrust rolling bearing allows rotational movement between the support cup for the spring, which may rotate, and the elastic support block, which is fixed to the body of the vehicle. The relative angular movement between the support cup for the spring and the elastic block results from turning the steered wheel and/or from compression of the suspension spring. The suspension thrust bearing also allows axial forces to be transmitted between the spring and the body of the vehicle.

Thus Document FR-A-2 829 429 describes a suspension thrust bearing including a thrust rolling bearing, a support cup for a spring and an elastic support block. The rolling bearing includes an upper race arranged in an annular upper cap forming an interface between the upper race and the elastic block, and a lower race. Also provided is an annular lower cap forming an interface between the lower race and the support cup for the spring. One cap may include an elastic lip extending radially in the direction of a skirt of the other cap, forming a narrow passage and cooperating with a radial flange of the skirt, so as to allow axial movement in one direction while prohibiting reverse axial movement.

However, in many struts of recent design the springs have a complex shape and, after they have been fitted on the vehicle, exert an axial force which does not pass through the axis of the rolling bearing. The geometry of the spring is such that before it is preloaded and during the start of preloading, the end turns of the spring exert non-uniformly distributed and/or localized forces over a limited angular sector of the respective bearing points. This is therefore manifested at the upper end of the spring by the application of a non-uniformly distributed force on the lower cap of the thrust bearing. When the region on which the spring bears is situated radially outside the diameter over which the balls bear on the races, the concentration of the spring bearing forces on a region of the cap situated outside the bearing region of the balls may exert on the lower cap a tilting moment about the balls which causes partial unlatching of the two caps on the side diametrically opposite to the force application point.

The radial latching interference is in fact relatively small because it is only intended to provide axial retention for handling the caps. Since the caps are made of a relatively rigid synthetic material—often glass-fiber-reinforced nylon-6,6 polyamide—a large interference could cause unacceptable stresses on the material and local cracking or fractures.

When the final preload is exerted on the spring, the lower turn bears completely on the cup, which produces a modification of the orientation and of the distribution of the load exerted by the spring on the cap, which tends to close again.

After carrying out numerous tests, the Applicant noticed that when the two caps are disunited beyond a certain limit, the said caps do not generally return correctly into position, and local relative friction between the said caps subsequently occurs and this forms the basis of incorrect operation of the suspension thrust bearing with generation of noise and an excessive frictional torque.

The embodiments described herein aim to overcome these drawbacks.

SUMMARY OF THE INVENTION

The present invention proposes a suspension thrust bearing tailored to various types of springs while retaining silent, reliable operation.

According to one embodiment, the suspension thrust bearing device includes a rolling bearing provided with two races and with rolling elements arranged between the races, and two caps each in contact with one race. One of the caps includes a circular flange and the other cap includes an axial portion provided with hooks intended for latching onto the flange. An axial space of height b remains between the said hooks and the said flange. One of the caps includes an operational part provided with a chamfer intended to facilitate latching with the other cap, with an axial surface of height A and of diameter D and with a substantially radial retention surface. The other cap includes an operational part provided with a chamfer intended to facilitate latching, with an axial surface of height c and with a substantially radial retention surface. The sum of the heights a+b+c is greater than 1.9% of the diameter D. It is thus possible to very significantly reduce the risk of malfunction of the thrust bearing due to excessive misalignment of the axes of the caps when mounting the spring.

In one embodiment, the caps are made of synthetic material, for example from polyamide.

Advantageously, one of the caps is a lower cap provided with a lower bearing surface for a spring or with a bearing cup for the spring.

In one embodiment, one of the caps is an upper cap provided with a downwardly directed axial skirt with hooks provided over its bore, the said skirt covering at least one circular flange of the other cap.

In one embodiment, one of the caps is an upper cap provided with a downwardly directed axial skirt provided with a flange on an inner portion, the said skirt covering at least part of the other cap which includes hooks. The flange may be annular.

In one embodiment, the height c is greater than the height a.

In another embodiment, the height c is less than the height a.

In one embodiment, the height c is greater than the height b.

In other words, the upper cap and lower cap generally include a device for mutual axial retention by means of clipping, making it possible to form an assembly which may be handled and transported without risk of accidental disassembly of the elements. The caps may also include sealing devices allowing the rolling bearing to be housed in a closed space isolated from external pollution such as splashing water and various contaminants. The assembly formed by the rolling bearing and the caps is arranged between the body of the vehicle and an upper part of the spring. It may bear on the body of the vehicle directly or by way of a cup or else a filtering elastic block. The spring, arranged around the damper, bears at its lower end on a support cup secured to the damper cylinder and, at its upper end, bears directly or indirectly on the lower cap. The spring is installed around the rod of the damper piston. The suspension thrust bearing thus allows the axial forces to be transmitted between the spring and the body of the vehicle.

The caps may be made of an injection-molded synthetic material, for example glass-fiber-reinforced nylon-6,6 polyamide. The upper cap and lower cap may be latched into place by positioning one of them concentrically over the other and exerting an axial force tending to bring them towards one another. The caps allow transmission of the axial forces between the raceways and the elements on which the thrust bearing bears, under good load distribution conditions.

BRIEF DESCRIPTION OF THE DRAWINGS

The present invention will be better understood on reading the detailed description of some embodiments which have been given by way of non-limiting example and are illustrated by the appended drawings, in which.

Figure 1:
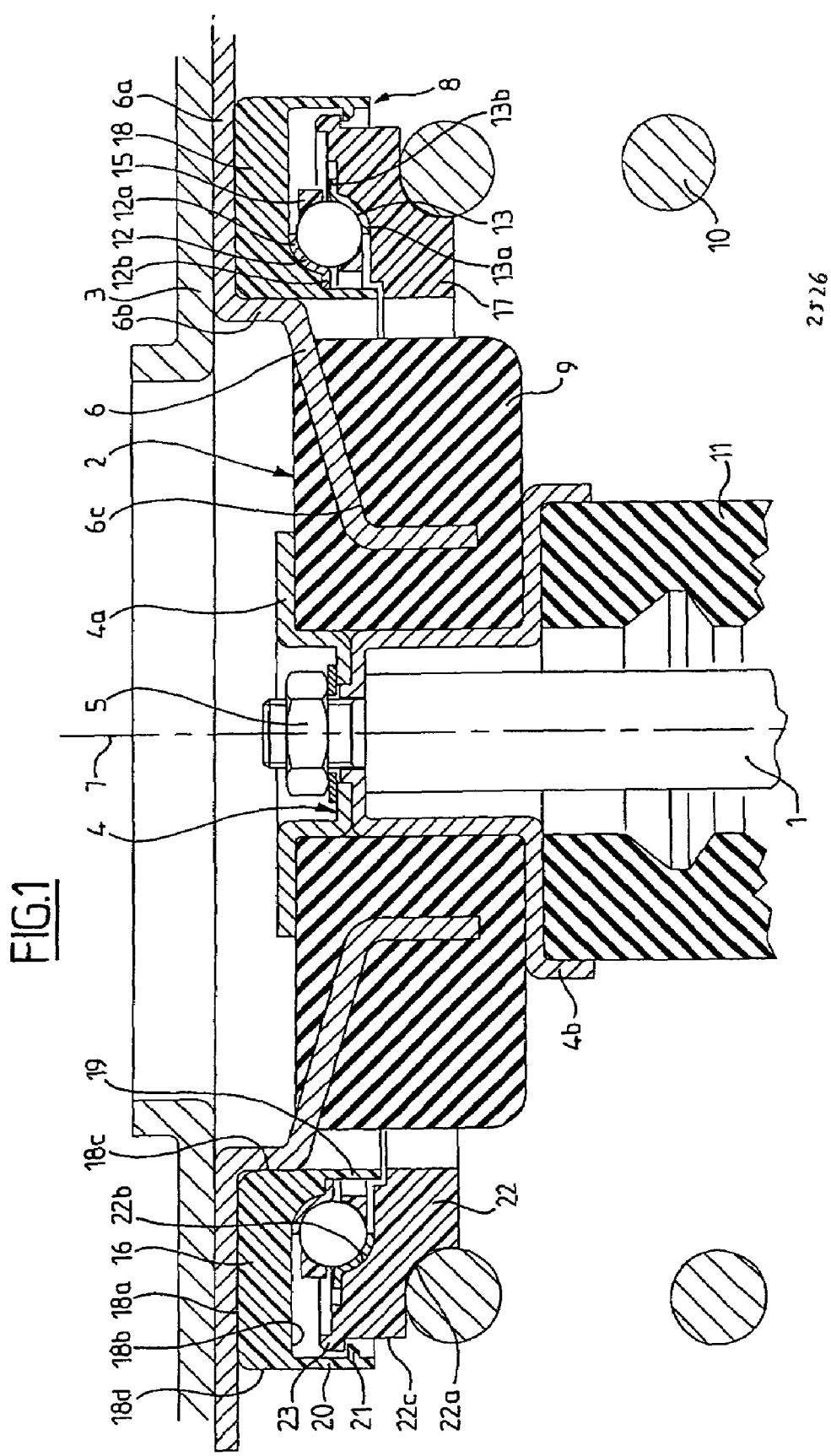
FIG. 1 is a view in axial section of the upper end of a suspension strut according to one aspect of the invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As can be seen in FIG. 1, the upper end of a damper includes a piston rod 1 connected by its upper end to an elastic support block 2 which bears in a seat-forming element of the chassis 3 and is secured to the latter.

The elastic support block 2 includes an annular inner connection element 4 made in two parts 4a and 4b, on which parts is mounted the end of the rod 1 of the damper piston by means of a nut 5, and an annular outer connection element 6 used for fastening to the chassis 3, all of these elements being centered around an axis 7. A thrust rolling bearing 8 is mounted in contact with the outer connection element 6. The elastic support block includes a rubber block 9 bonded to the surface of an inner part of the outer connection element 6 and clamped between the cup-shaped parts 4a and 4b of the inner connection element 4. An axial connection with vibration filtering is thus produced between the rod 1 and the chassis 3. The outer connection element 6 is fixed to the chassis 3 by means which have not been shown, for example by screwing or bolting.

Also visible is the suspension spring 10, the upper end of which presses on the thrust rolling bearing 8, and a damper pad 11 secured to the lower end of the lower part 4b of the inner connection element 4, surrounding the piston rod 1 and forming a final damping means in the event of bottoming in order to prevent direct contact between the damper cylinder and the said lower part 4b of the inner connection element 4.

The outer connection element 6 includes an outer radial portion 6a in contact with the chassis 3 on one side, and with the thrust rolling bearing 8 on the lower side, which is extended downwards from its inner end by an axial portion 6b, also in contact with a bore of the thrust rolling bearing 8. The outer connection element 6 is completed by a portion 6c embedded in the rubber block 9 and emanating from the lower end of the axial portion 6b.

The thrust rolling bearing 8 includes a rolling bearing having an upper race 12 and a lower race 13, between which races are housed the rolling elements 14, in this instance balls, maintained with regular circumferential spacing by a cage 15 made of synthetic material. The upper race 12 and lower race 13 are formed of steel sheet by cutting and stamping, advantageously from two concentric portions of the same sheet blank.

The upper race 12 includes a toroidal portion 12a having, in cross section, a concave internal profile in the form of a quarter of a circle and able to form a toric raceway for balls, the said toroidal portion 12a being inwardly extended by a radial portion 12b extending from a lower edge of the toroidal portion 12a.

The lower race 13 includes a toroidal portion 13a having, in cross section, a concave internal profile in the form of a quarter of a circle and able to form a toric raceway for balls, the said toroidal portion 13a being outwardly extended by a radial portion 13b extending from an upper edge of the toroidal portion 13a. The outside diameter of the upper race 12 is substantially equal to the inside diameter of the lower race 13.

The suspension thrust bearing 8 additionally includes an annular upper cap 16 and an annular lower cap 17 made of synthetic material such as a polyamide of the glass-fiber-reinforced nylon-6,6 type. The upper cap 16 includes a solid upper part 18 provided with a radial upper surface 18a in contact with the lower surface of the radial portion 6a of the outer connection element 6, with a lower surface 18b of substantially radial shape but provided on its inner end with a toroidal region matching the shape of the toroidal portion 12a of the upper race 12, with a bore 18c which may be fitted onto the axial portion 6b of the outer connection element 6, and with an axial outer surface 18d. The upper cap 16 is completed by an inner axial skirt 19 situated in the continuation of the bore 18c and pointing downwards and an outer axial skirt 20 situated in the continuation of the axial outer surface 18d of the solid portion 18 and pointing downwards. Over its bore, the skirt 20 bears a plurality of radially inwardly directed hooks 21 or lugs arranged in a common radial plane with regular circumferential distribution.

The lower cap 17 includes a solid portion 22 having an outside diameter less than that of the upper cap 16 and a bore of the same diameter as the bore 18c. On its lower surface, the lower cap 22 includes a bearing surface 22a for the end turn of the spring 10 in the form of an outwardly opening radial surface which extends inwardly by way of a toroidal portion in the form of a quarter of a circle, thus providing good centering of the spring 10. The upper surface 22b of the solid portion 22 includes a central region of toroidal shape matching the shape of the toroidal portion 13a of the lower race 13 and being inwardly and outwardly extended by two radial regions.

The lower cap 17 is completed by an annular flange 23 formed at the junction of the upper surface 22b and of an axial outer surface 22c of the solid portion 22. The outer axial surface 22c of the solid portion 22 has a diameter which is less than the diameter of the imaginary circle passing through the free inner radial ends of the hooks 21 of the upper cap 16. The annular flange 23 of the lower cap 17 has an outside diameter which is greater than the smallest imaginary diameter of the hooks 21 and less than that of the bore of the outer axial skirt 20 of the upper cap 16. In the assembled position, illustrated in FIG. 1, the flange 23 is arranged above the hooks 21.

Figure 2:
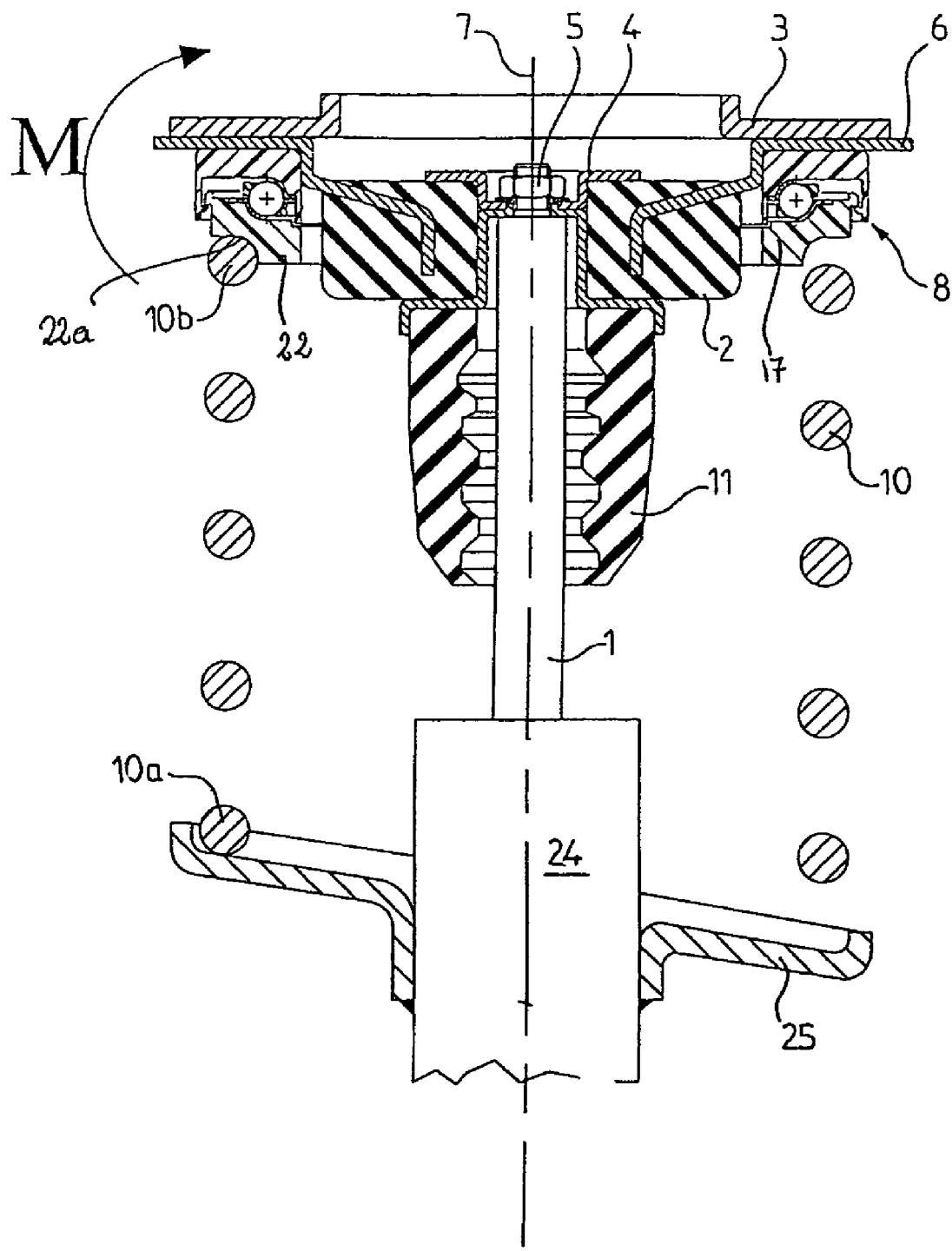
FIG. 2 is a more complete view of the strut of FIG. 1.

The general structure of the damper will be better understood with reference to FIG. 2, which shows the damper rod 1 projecting upwards from the damper cylinder 24. A cup 25 is secured to the cylinder 24, for example by welding, and accommodates the lower end turn 10a of the spring 10, this end turn bearing on it directly or by way of an intermediate component. The upper end turn 10b of the spring 10 bears on the surface 22a of the solid portion 22 of the lower cap 17. During assembly of the thrust bearing in the suspension device, the said thrust bearing is progressively preloaded by the spring. If the geometry and/or the positioning of the spring are such that the force exerted by the upper end turn 10b of the spring on the surface 22a of the solid part 22 of the lower cap 17 is not uniformly distributed over the said cap, the result is a tilting moment M which tends to cause that side of the lower cap 17 which is most loaded by the turn 10b to lift up and the opposite side of the cap 17, to the right in FIG. 2, to drop down, that is to say in the direction of the cup 25, this effect being all the more pronounced because the spring 10 has a coil diameter greater than the diameter of the circle passing through the center of the rolling elements 14.

Figure 3:
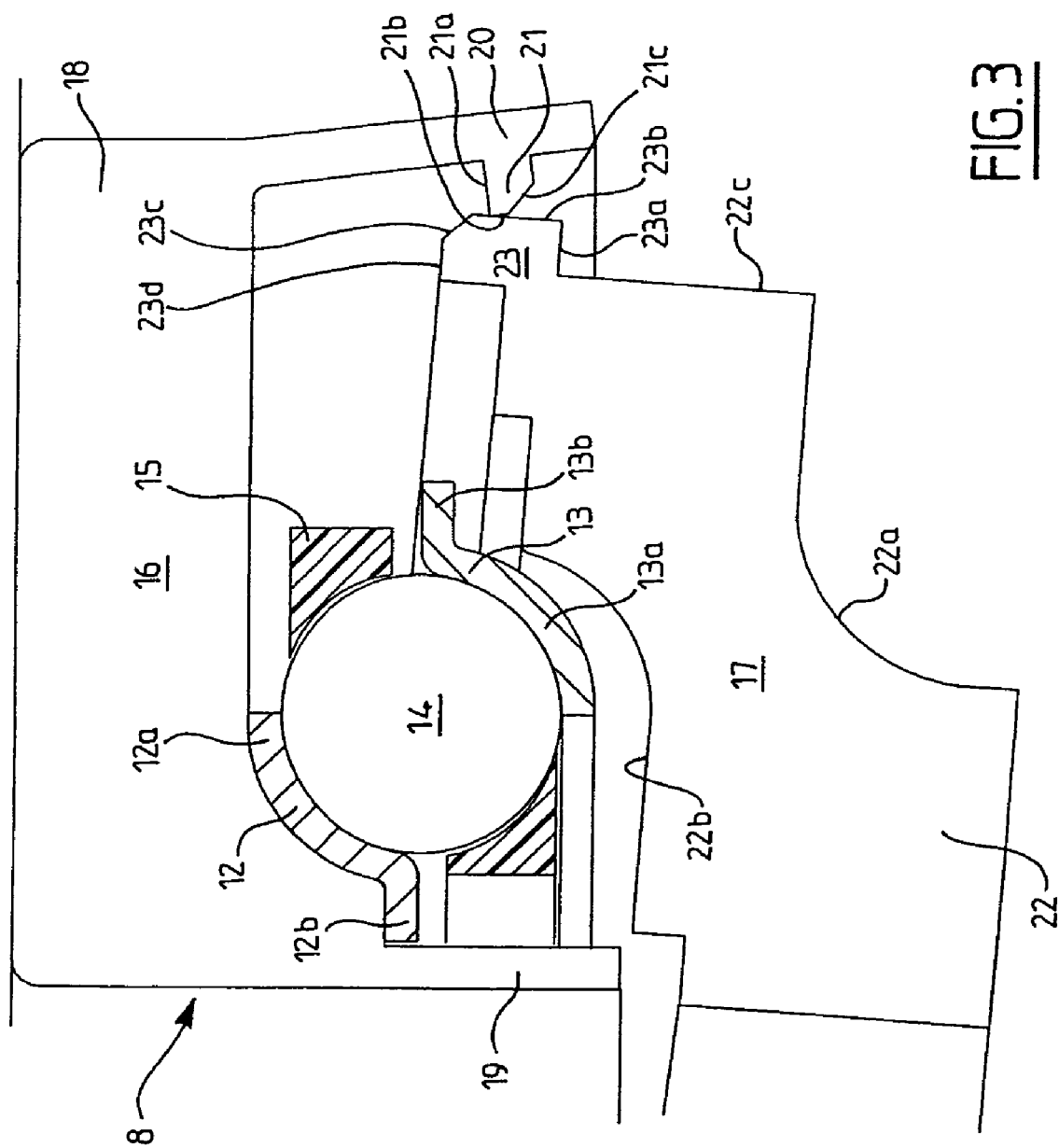
FIG. 3 is a detail view of a suspension thrust bearing during unclipping of the caps.

As can be seen in FIG. 3, the tilting moment M is liable to cause partial disengagement of the lower cap 17 and upper cap 16. It can be seen here that the hooks 21 formed over the bore of the outer axial skirt 20 of the upper cap 16 include a radial upper surface 21a, an axial bore 21b and a lower chamfer 21c forming a frustoconical surface oriented at approximately 45° with respect to the axis 7. The annular flange 23 of the lower cap 17 includes a radial lower surface 23a, an axial outer surface 23b, an upper chamfer 23c forming a frustoconical surface oriented at approximately 45° with respect to the axis 7, and finally a radial upper surface 23d.

The skirt 20 of the upper cap 16 is in this case deformed and deflected radially outwards while the inner axial surface 21b of the hooks 20 is in frictional contact with the outer axial surface 23b of the flange 23 of the lower cap 17.

Such a transient position during assembly may be tolerated perfectly well. During the final loading of the device, the upper turn 10b of the spring 10 will come into contact with the lower cap over a greater angular portion and will then cause better distribution of the bearing forces, as a result of which that part of the lower cap 17 which is dropped down in FIG. 3 will lift up again and the flange 23 will latch once more with the hooks 21.

Figure 4:
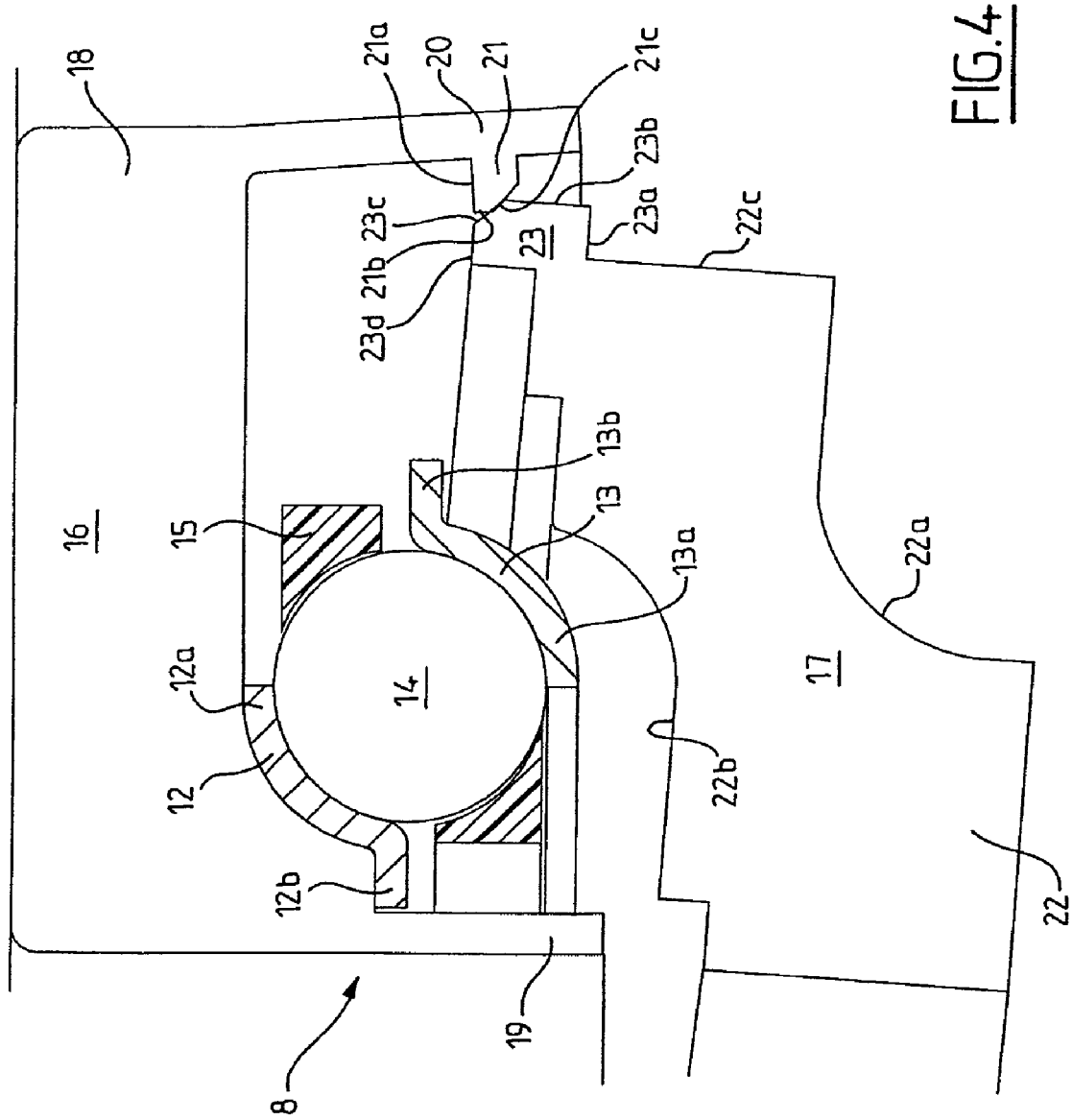
FIG. 4 is a detail view of a suspension thrust bearing with caps detached from one another.

If, however, the thrust bearing is in the situation illustrated in FIG. 4 during the transient loading phase, one side of the lower cap 17 is offset to an even greater degree, the respective axial surfaces of the flange 23 and of the hooks 21 no longer being in contact. Rather, the respective chamfers 23c and 21c of the flange 23 and of the hooks 21 are in mutual contact. Experience has shown that in this case it is not generally possible to correctly relatch the caps and return to the normal operating position, even when the spring 10 is bearing more forcefully on the lower cap 17. What may actually occur are permanent local deformations and misalignments of the caps, leading to unwanted friction generating excessive operational torque of the thrust bearing and/or undesirable noise in the vehicle.

Figure 5:
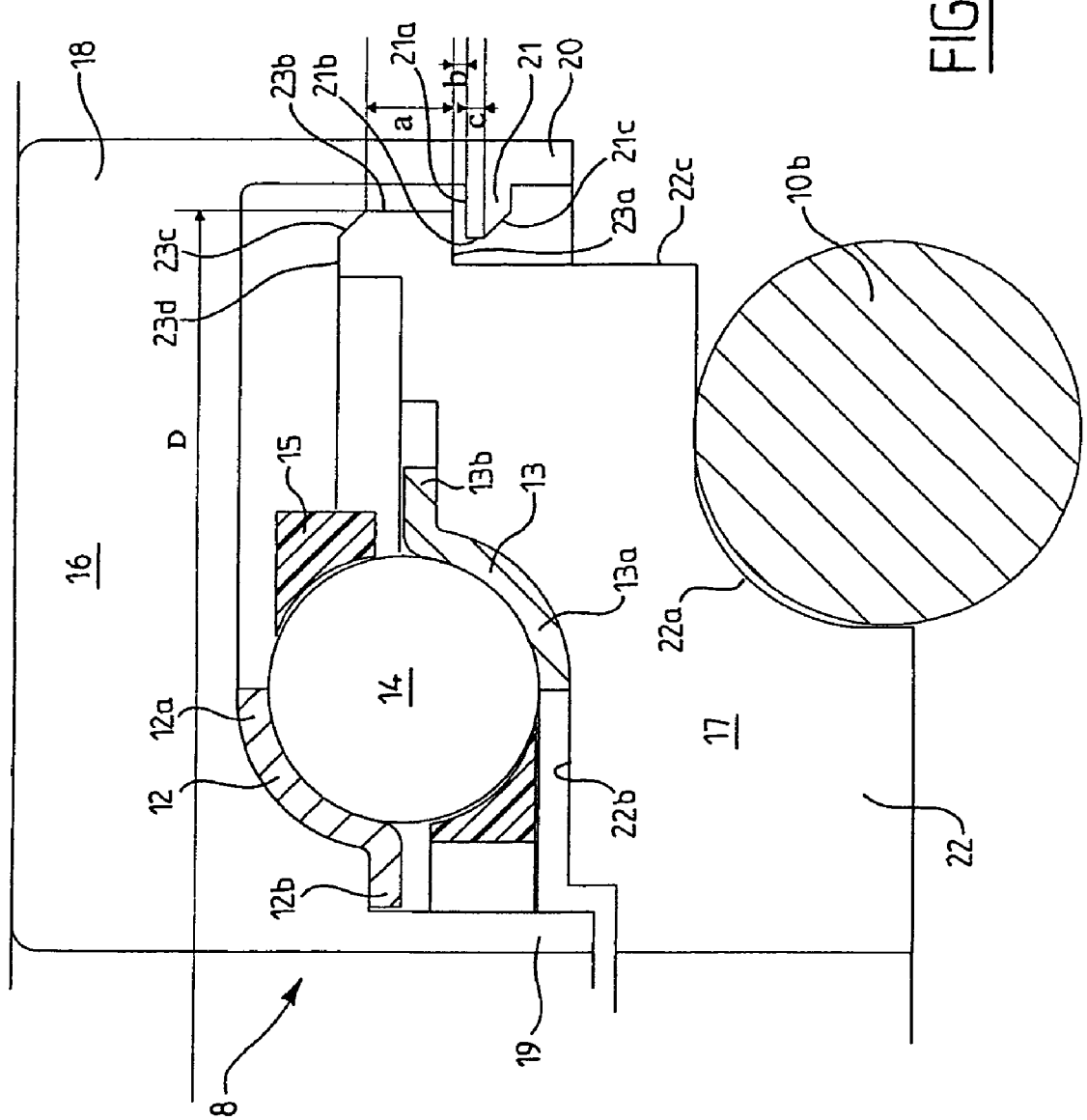
FIG. 5 is a detail view of a suspension thrust bearing with caps in the normal position.

FIG. 5 shows a suspension strut during normal operating conditions, with D denoting the diameter of the axial outer surface 23b of the flange 23, "a" denoting the height in the axial direction of the said axial outer surface 23b, "b" denoting the axial distance separating the radial lower surface 23a of the flange 23 from the radial upper surface 21a of the hooks 21, and "c" denoting the height in the axial direction of the axial inner surface 21b of the hooks 21. After carrying out numerous tests, the Applicant noticed that the four parameters stated above had to be correlated with respect to one another to avoid creating the situation illustrated in FIG. 4, in which return to a normal position as illustrated in FIG. 5 is extremely difficult, while at the same time tolerating the transient position illustrated in FIG. 3 in which return to the normal position remains possible during loading of the thrust bearing. It was thus determined that the sum a+b+c of the axial heights should be greater than 1.9% of the diameter D. It will be understood that the greater the diameter of the lower cap, the greater an offset from a given angle will result in a large offset in terms of height at the flange on the side in question owing to this tilting of the lower cap. The axial height "b", which corresponds to the clearance between the radial lower surface 23a of the flange 23 and the radial upper surface 21a of the hooks 21, also participates in this phenomenon. It is thus possible to prevent the circle intersecting the chamfer 23c and the axial outer surface 23b of the flange 23 from passing below, even at a single point, the circle intersecting the chamfer 21c and the axial inner surface 21b of the hook 21.

Figure 6:
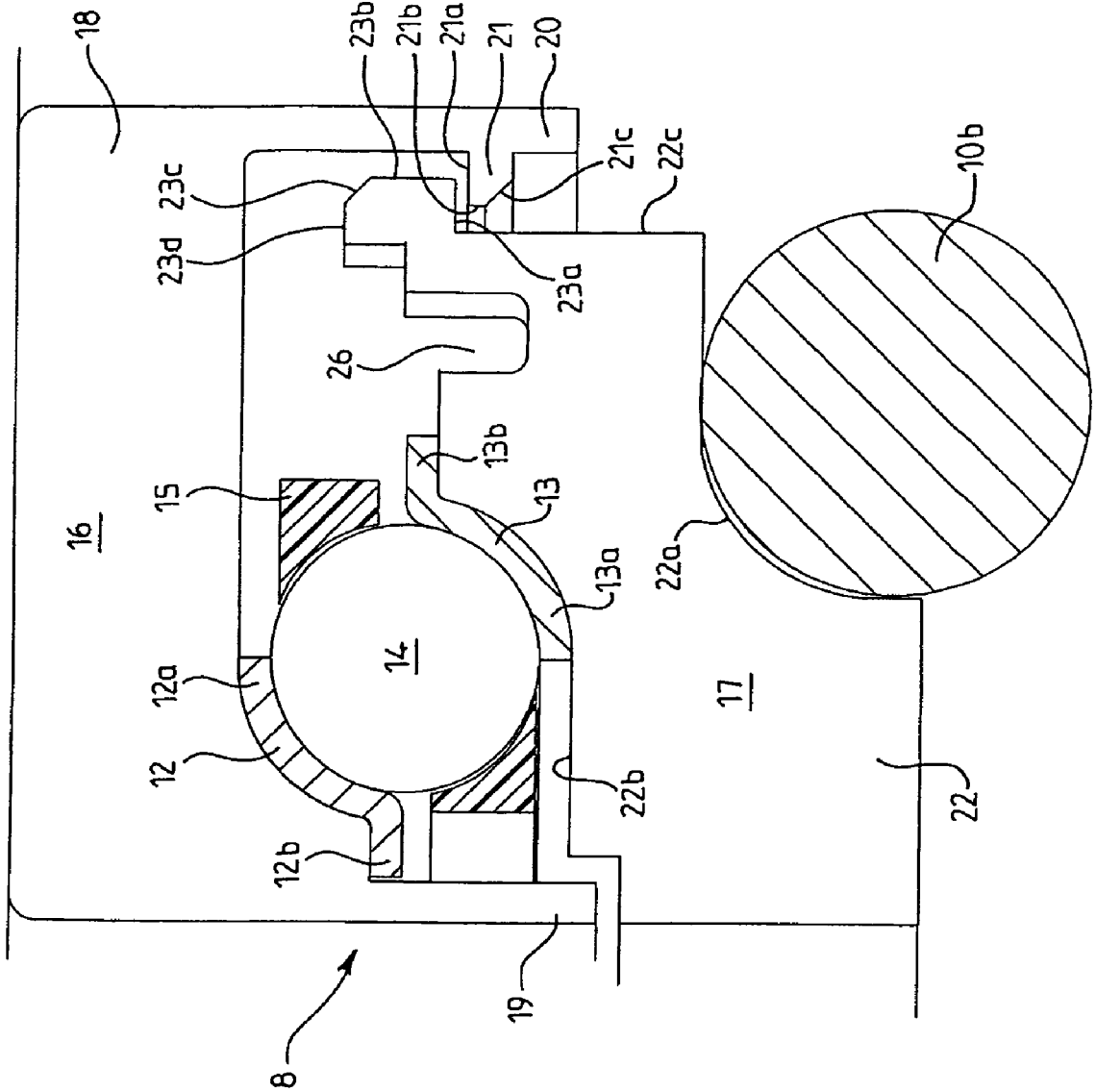
FIG. 6 is a variant of FIG. 5.

The embodiment illustrated in FIG. 6 is similar to the preceding one apart from the fact that the flange is replaced by a series of hooks 23 on the lower cap 17 which have approximately the same shape as the said flange in axial section and are regularly spaced circumferentially. The hooks on the upper cap 16 are replaced by an annular flange 21 which has an identical shape in axial section and is circularly continuous. In this case the deflection will be provided by the hooks 23 and no longer by the outer skirt 20. To this end, a slot 26 is made in the upper surface 22b of the solid portion 22 of the lower cap 17, radially between the hooks 23 and the large-diameter radial portion 13b of the lower race 13, in order to increase the flexibility of the hooks 23 and therefore promote their deflection during assembly.

Thus, when the thrust bearing is in a position where the caps are axially staggered, that is to say when it is exposed in the end position, a portion of the device for retaining one of the caps may remain in contact with an axial surface of the device for retaining the other cap.

By means of the embodiments described herein, a reliable device for latching the upper and lower caps may be produced in a simple manner, this device being able to temporarily tolerate partial and angularly localized unlatching during the spring preloading phase. Thus, during spring preloading, the upper turn 10b of the said spring 10 starts to bear at a single point on the lower surface 22a of the solid portion 22 of the lower cap 17 and then comes into contact with the said surface 22a over an angular sector which becomes increasingly large as the axial preloading force is increased, until such time as the angular bearing sector is sufficiently large for the tilting moment to be zero or to be reversed, which allows suitable relatching of the devices for the mutual retention of the lower and upper caps. Of course, the invention may be designed with numerous variants. It is possible to provide an axial height "c" which is greater than the axial height "a" in contrast to what is illustrated in FIG. 5, or else an axial height "b" greater than the axial height "c" or else greater than the axial height "a".

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A suspension thrust bearing device comprising:
    a rolling bearing provided with two races and with rolling elements arranged between the races, and
    two caps each in contact with one race, wherein one of the caps comprises a circular flange, and wherein the other cap comprises an axial portion provided with hooks intended for latching onto the flange, and wherein the hooks leave an axial space of height b remaining between the hooks and the flange, and wherein one of the caps comprises an operational part provided with a chamfer intended to facilitate latching with the other cap, with an axial surface of height a and of diameter D and with a radial retention surface, and wherein the other cap comprises an operational part provided with a chamfer intended to facilitate latching, with an axial surface of height c and with a radial retention surface, the sum of the heights a+b+c being greater than 1.9% of the diameter D.

2. The device of claim 1, wherein the caps are made of synthetic material.

3. The device of claim 2, wherein the caps comprise polyamide.

4. The device of claim 1, wherein one of the caps is a lower cap provided with a lower bearing surface for a spring.

5. The device of claim 1, wherein one of the caps is an upper cap provided with a downwardly directed axial skirt equipped with hooks over its bore, and wherein the axial skirt coveres at least one circular flange of the other cap.

6. The device of claim 1, wherein the height c is less than the height a.

7. The device of claim 1, wherein the height c is greater than the height b.

* * * * *